US007233080B2

(12) United States Patent
Garnault et al.

(10) Patent No.: US 7,233,080 B2
(45) Date of Patent: Jun. 19, 2007

(54) METHOD FOR PROCESSING DETECTION SIGNALS FOR A MOTOR VEHICLE

(75) Inventors: Joël Garnault, Sannois (FR); Thierry Benard, Paris (FR)

(73) Assignee: Valeo Electronique, Paris (FR)

( * ) Notice: Subject to any disclaimer, the term of this patent is extended or adjusted under 35 U.S.C. 154(b) by 271 days.

(21) Appl. No.: 10/362,950

(22) PCT Filed: Sep. 4, 2001

(86) PCT No.: PCT/EP01/10167

§ 371 (c)(1), (2), (4) Date: Jun. 19, 2003

(87) PCT Pub. No.: WO02/21455

PCT Pub. Date: Mar. 14, 2002

(65) Prior Publication Data

US 2004/0039511 A1 Feb. 26, 2004

(30) Foreign Application Priority Data

Sep. 5, 2000 (FR) .................................. 00 11299

(51) Int. Cl.
*B60R 25/00* (2006.01)

(52) U.S. Cl. ..................................................... 307/10.2

(58) Field of Classification Search ................ 307/10.2
See application file for complete search history.

(56) References Cited

U.S. PATENT DOCUMENTS

| | | | | |
|---|---|---|---|---|
| 5,774,064 | A * | 6/1998 | Lambropoulos et al. | 340/825.69 |
| 5,973,611 | A * | 10/1999 | Kulha et al. | 340/5.62 |
| 6,062,612 | A * | 5/2000 | Lin | 292/144 |
| 6,075,294 | A | 6/2000 | Van den Boom et al. | |

FOREIGN PATENT DOCUMENTS

| | | |
|---|---|---|
| DE | 197 38 560 A1 | 3/1998 |
| DE | 197 10 476 A1 | 9/1998 |
| EP | 0 735 219 A2 | 10/1996 |
| EP | 0 970 859 A2 | 1/2000 |
| WO | WO 99/19585 | 4/1999 |

* cited by examiner

*Primary Examiner*—Chau N. Nguyen
*Assistant Examiner*—Dru Parries
(74) *Attorney, Agent, or Firm*—Berenato, White & Stavish

(57) ABSTRACT

The invention concerns a method for processing a motor vehicle detection signals. It consists in taking into account data concerning the surroundings to interpret the detection signals and deliver actuating signals. The invention also concerns a device for implementing said method and an opening panel handle (1) and a vehicle comprising such a device.

29 Claims, 6 Drawing Sheets

METHOD FOR PROCESSING DETECTION SIGNALS FOR A MOTOR VEHICLE

Figure 1:
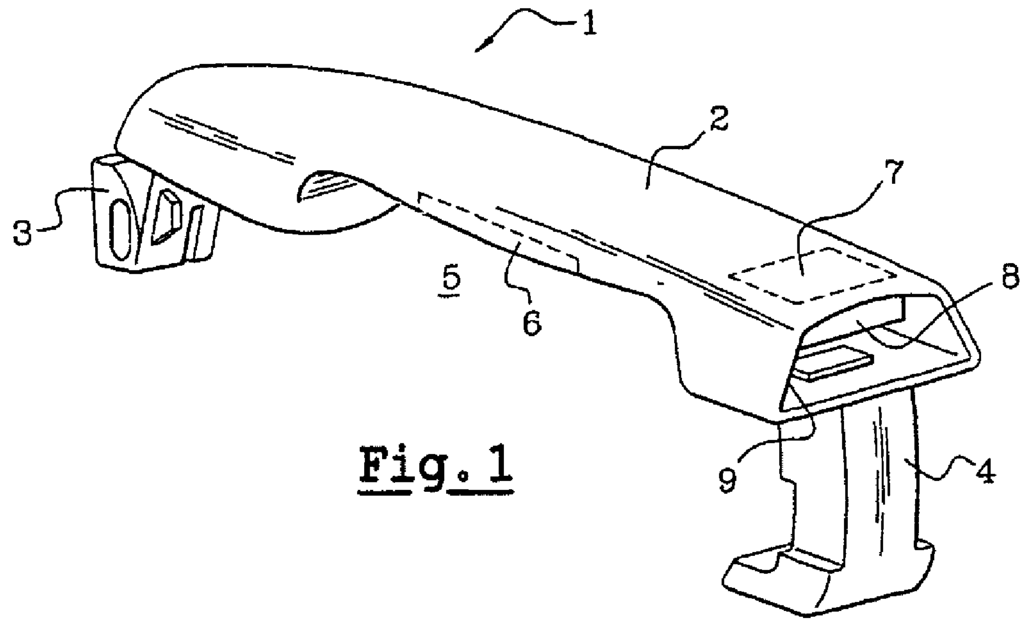

The present invention relates to a method of processing detection signals originating from at least one detection zone disposed on a motor vehicle, a device for the implementation of this method, an openable panel handle and a motor vehicle furnished with such means.

Motor vehicles furnished with at least one central locking system comprise on the one hand various sensors which collect information about the actions of the users and on the other hand control means which utilize this information so as to trigger various devices in response to said actions of the users.

In modern vehicles, recourse to capacitive or optical sensors is tending to be generalized in order to carry out presence detection functions not using mechanical means.

Hence, capacitive or optical sensors are mounted on handles of openable panels and more particularly on doors.

These sensors are advantageous in that they suffer no mechanical wear and therefore provide reliable information throughout the duration of their life.

Capacitive sensors are for example used to detect a touch, they are then known as tactile sensors, or the approaching of a user's hand with respect to a given surface, they are then referred to as approach sensors.

Optical sensors detect cuttings of light beams. They belong to the category of approach sensors.

The presence of such sensors for executing various commands is, certainly, advantageous by comparison with mechanical sensors, as has just been recalled, but nevertheless poses a few difficulties related to the fact that it is necessary to manage all the sensors simultaneously, thereby necessitating the presence in the vehicle of relatively complex electronic means able to settle any conflicts between sensors, and that it is necessary to support the cost of supplying and fitting these sensors and the associated electronic means.

The present invention aims to propose a solution in which the number of sensors used is optimized and in which the electronic means required in the vehicle can be simplified.

This invention finds a particularly beneficial application in motor vehicles furnished with a so-called "hands free" system, in which the various actions of the users give rise first of all to a search for an identifier making it possible to ascertain whether the person whose action has been detected is an authorized user of the vehicle.

The subject of the present invention is a method of processing detection signals originating from at least one detection zone disposed on a motor vehicle, characterized in that it consists in taking into account, following the reception of said detection signals, environmental information characteristic of a current state of the vehicle, and in interpreting the signal received as a function of this environmental information so as to provide an actuation signal intended for control means belonging to the motor vehicle.

Within the meaning of the present invention, the term control means is understood to mean the set of devices present in the vehicle for executing orders for locking/unlocking openable panels, circuit breaker activation/deactivation, alarm activation/-deactivation, engine startup/stoppage, and more generally any command for switching on/off any facility of the vehicle.

By virtue of the invention, orders which can be executed directly by said control means are delivered to the control means in the form of actuation signals.

Stated otherwise, the invention makes a distinction between a first category of rules, which may be dubbed discriminatory, making it possible to determine what the user's intention is when he activates a detection zone and a second category of rules, which can be dubbed arbitral, relating to the management of the priorities between various a priori contradictory or incompatible intentions which are however expressed simultaneously by one or more users.

By virtue of the invention, the method for processing detection signals is responsible for applying the discriminatory rules, thereby making it possible to relieve the control means of this responsibility, they now only having to ensure, if necessary, the management of the priorities with the aid of the arbitral rules.

In a particular embodiment, the environmental information relates to the state of locking of the openable panels of the vehicle.

Stated otherwise, the method takes account of the fact that all the openable panels or at least some of them are locked or unlocked.

In certain circumstances, the mere knowledge of the environmental information is not sufficient to interpret a detection correctly. This may be the case if the detection always originates from the same sensor although the user acts in two different locations of the vehicle (for example in two zones apparently separated by a delimitation on a handle which in reality contains only one sensor) with the aim of triggering two different actions. Discrimination between the two actions must therefore be performed by the processing method.

To this end, according to a particular mode of implementation of the invention, during the reception of the detection signal, temporal information related to the detection signal received is also taken into account in addition to the environmental information, for example its duration for a delay elapsed between its reception and an additional event prompted by the user.

The invention makes provision for various categories of commands resulting from the interpretation of the detection signal. One of these commands is the verification of the identity of the person whose action is detected, which verification is particularly important within the framework of the operation of a "hands free" system.

To trigger such an action, a check is carried out as to whether the environmental information satisfies predetermined conditions, such as for example that all the openable panels of the vehicle are locked, in which case provision may be made for the identity verification command to be followed by an unlocking command.

In this case, the temporal information can be used to interpret the signal received as a command for locking or for unlocking a single openable panel or all the openable panels of the vehicle.

This temporal information can consist of the duration of the signal received, a signal of short duration corresponding for example to the unlocking of an openable panel associated with the detection zone while a signal of long duration corresponds for example to the unlocking of all the openable panels.

In a variant, the delay between the start of the detection signal received and the change of position of a switch is chosen as temporal information related to the detection signal received.

For example, the switch can be linked to a handle for opening an openable panel, the switch changing position when the handle is operated or released, the associated openable panel being for example unlocked only if the delay between the start of detection and the change of position of the switch is less than a predetermined duration, while all the openable panels are for example unlocked if said delay reaches the predetermined duration.

It is also possible in a variant to adopt the rule that the openable panel is unlocked if the delay is greater than a predetermined duration.

In a particular embodiment, the method according to the invention is implemented so as to automatically lock an openable panel of a motor vehicle with the aid of a hands free access system comprising a recognition device intended to be installed inside the vehicle and a handheld identification facility, said recognition device being able to communicate remotely with the identification facility so as to authenticate it.

This method applies to a vehicle equipped with a hands free access system configured so that a user of the vehicle can enter the latter without having to operate either a key or a remote control.

Such a vehicle usually comprises an approach sensor coupled to the recognition device of the hands free access system so that an authentication attempt is triggered when the approach sensor detects the presence of a user. Thus, in the case where the authentication attempt is successful, the recognition device triggers the unlocking of one or more openable panels of the vehicle.

On the other hand, in order to trigger the locking of the openable panels of a vehicle equipped with a hands free access system, it is generally necessary for the user either to actuate a pushbutton of the handheld identification facility, which then plays a remote control role, or to quit the communication zone between the recognition device and the identification facility so that the recognition device implicitly instructs the locking of the vehicle.

The defect of these two modes of locking the vehicle is that they do not allow the user to trigger the locking of his vehicle while being placed in proximity thereto so as to verify that the locking has indeed occurred, without having to operate the handheld identification facility.

One of the aims of the present invention is to remedy this drawback by affording an improvement to the ergonomics of hands free access systems.

To this end, in a particular embodiment, the method according to the invention consists in automatically locking an openable panel of a motor vehicle with the aid of a hands free access system comprising a recognition device intended to be installed inside the vehicle and a handheld identification facility, said recognition device being able to communicate remotely with the identification facility so as to authenticate it, by providing the control means of the vehicle, following the authentication of the identification facility, with a signal for locking or for unlocking the openable panel of the vehicle.

With such a method, it is possible to lock the openable panel of the vehicle without remote control while remaining in proximity to the vehicle.

The locking of the vehicle can for example be achieved by activating a detection zone with the hand but without operating the door handle of the vehicle which is in the closed state. It is sufficient to monitor for example a change of position of a two-position switch linked with the motion of the handle so as to detect the released or engaged position of the handle. It would equally well be possible to monitor the change of position of an (interior) open-door contactor which detects the closed or open position of the door of the vehicle. This method has the advantage of being able to be implemented with the items already present on a hands free access system configured so as to automatically trigger the locking of an openable panel of the vehicle.

According to a preferred mode of implementation of the method according to the invention, a signal for locking the openable panel of the vehicle is delivered, before the expiration of a predetermined delay, as soon as the approach sensor no longer provides any detection signal.

In this way, the locking of the vehicle can be triggered in a very short time.

According to yet another particular mode of implementation of the method according to the invention, said predetermined delay has a duration prerecorded in the recognition device, so that operational instabilities related to the unlocking criteria can be avoided.

According to another particular mode of implementation of the method according to the invention, a signal for locking the openable panel is delivered only if the recognition device authenticates the identification facility, the locking of the vehicle being achievable only by a user carrying an identification facility.

The present invention also relates to a particular technical problem which comes within the framework of the more general problem, explained previously, of the simultaneous management of several sensors.

Specifically, on the handles of doors, two capacitive sensors may be provided: one oriented toward the interior of the handle and which fulfills the function of approach sensor, the other oriented toward the exterior of the handle and which fulfills the function of tactile sensor.

The approach sensor detects whether the user is passing his fingers behind the handle in order to grasp it and, for example, open the door.

The tactile sensor detects whether the user is applying a finger to said sensor, for example in order to lock all the openable panels of the vehicle.

Each sensor therefore corresponds for the user to a particular function.

A difficulty which arises with these capacitive sensors is that their proper operation is conditioned by the absence, in their environment, of materials capable of disturbing them, such as the electrically conducting materials which either mask the sensor or sensors and disable them, or spread their detection zones so that in case of detection, any sensor which has reacted is not necessarily a sensor to which the action triggered by the user pertains.

Stated otherwise, an approach detection may be wrongly taken to be a tactile detection following the inadvertent actuation of the two sensors, thus introducing erroneous information into the means of control of the detection signals.

Such a disturbance occurs in particular when the sensors are covered with an electrically conducting paint.

Such is generally the case owing to the presence of metallic particles introduced into paints in order to achieve their application by electrostatic attraction, as is known. This phenomenon is aggravated if a paint is a metallization layer, in which case, it is the metallic pigments required for esthetic rendition which impede the proper operation of the sensors, more than the particles required for the implementation of the electrostatic painting method.

The present invention is therefore also aimed at proposing a solution making it possible to overcome this difficulty related to the presence of materials which disturb the proper operation of the sensors.

Specifically, in a particular embodiment of the invention, when the environmental information fulfills predetermined conditions, the detection signal received is interpreted as having to be ignored.

Thus, the method according to the invention makes it possible to intervene on the signals provided by several sensors before said signals give to rise to undesirable actions.

Therefore, in a particular mode of implementation, it is possible to process the detection signals originating from at least two independent detection zones, each of which is able to provide its own detection signal.

The present invention derives its originality from the fact that the inventors, rather than seeking to palliate the deficiencies of sensors when they are placed in an unfavorable environment, have searched for a solution making it possible to accommodate degraded operation of said sensors without degradation in regard to the analysis of the detection signals.

In a particular mode of implementation of the invention, the detection zone or zones are mounted on a handle of the vehicle.

In an advantageous variant, the handle is itself mounted on an openable panel of the vehicle.

In accordance with the invention, the detection zones can be coated with a material capable of disturbing their proper operation. Such a material can be an electrically conducting material such as a paint incorporating metallic particles, the detection zones being zones sensitive to a variation in electric or electromagnetic field.

According to the invention, the ignoring of the signal from a detection zone may consist of various implementations.

First of all, ignoring the signal can consist in disabling the means of reading the signal from the detection zone.

Ignoring the signal can also be achieved by replacing said signal with a constant signal of true Boolean value, in such a way that a detection is regarded as having occurred as soon as the predetermined conditions are satisfied and independently of an actual detection signaled by the sensor.

Another possibility can consists in replacing the result of any check performed on the detection signal, that is to say checks of detection and also checks of absence of detection, with the true Boolean value, this amounting to no longer taking account of the signal originating from the relevant sensor, whether a detection is or is not achieved.

The subject of the present invention is also a device for the implementation of the method described hereinabove.

Such a device consists of a processing means comprising at least one state module able to take into account environmental information, as well as at least one signal interpretation module, said interpretation module providing an actuation signal depending on the environmental information and directly usable by the control means.

In a particular embodiment of the invention, the device furthermore comprises duration measuring means providing information related to the detection signal received and/or means for verifying predetermined conditions.

In a particular embodiment, the interpretation module is placed directly downstream of a sensor and consists of an OR gate accepting as input on the one hand the signals from the sensor, on the other hand the result, provided by the state module, of the verification of the conditions.

This embodiment is suited to control means which perform only checks of positive detection on the sensor, that is to say which verify that a detection has occurred, since these checks are systematically rendered positive by the true value resulting from the verification of the predetermined conditions when the latter are fulfilled.

In a variant, suited to means of control which perform only checks of negative detection, that is to say which verify that no detection has occurred, the OR gate is replaced by a NOT gate at the output of the state checking module and an AND gate combines this output with the signal from the sensor.

Finally, if the control means check positive detection as well as negative detection by the sensor by virtue of detection checking modules, it is preferable for the interpretation model to be placed not directly downstream of the detection zone but directly downstream of any detection checking module and for it to consist of an OR gate combining the result of the detection check with the result of the verification of predetermined conditions, in such a way that the result of the check seen by the control means is always true if said conditions are fulfilled.

In a particular embodiment of the invention, the detection zones form an integral part of a vehicle handle, which is advantageously mounted on an openable panel of the vehicle.

The subject of the present invention is also a motor vehicle openable panel handle comprising on the one hand at least one detection zone, on the other hand, a processing device as described above, providing an actuation signal directly usable by control means outside the handle.

In a particular embodiment, the detection zone is sensitive either to a variation in electric or electromagnetic field, or to a cutting of a light beam.

The detection zone is advantageously disposed on the handle in such a way that the ambient electric or electromagnetic field is disturbed or that the optical beam is cut when a hand is engaged with the handle.

Finally, the subject of the present invention is a motor vehicle comprising at least one openable panel, at least one detection zone and a processing device such as described hereinabove.

In a particular embodiment, the openable panel is furnished with a handle, incorporating the processing device.

Figure 2:
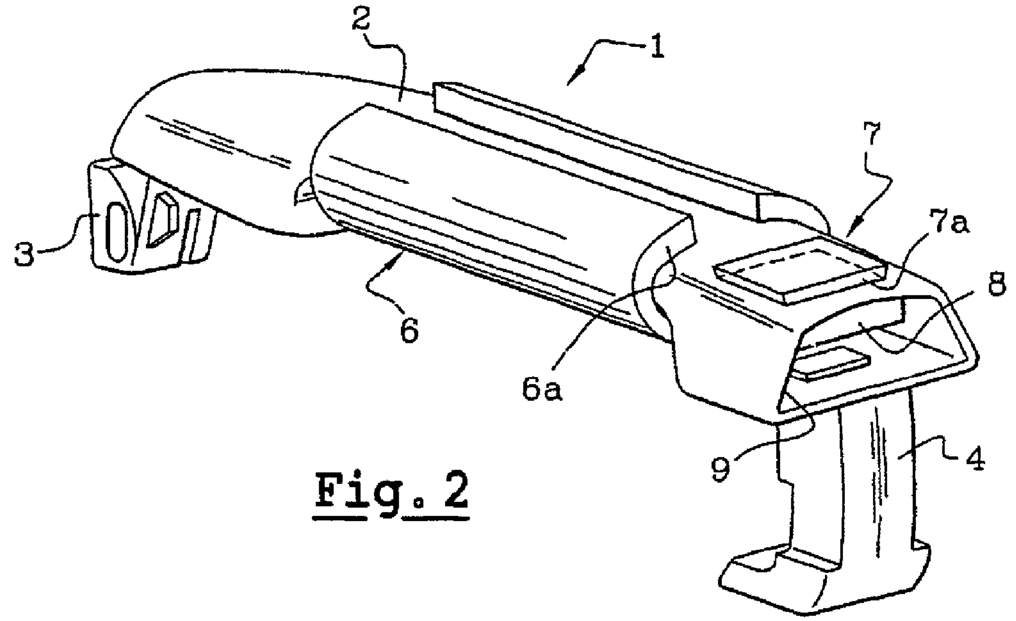
Figure 3:
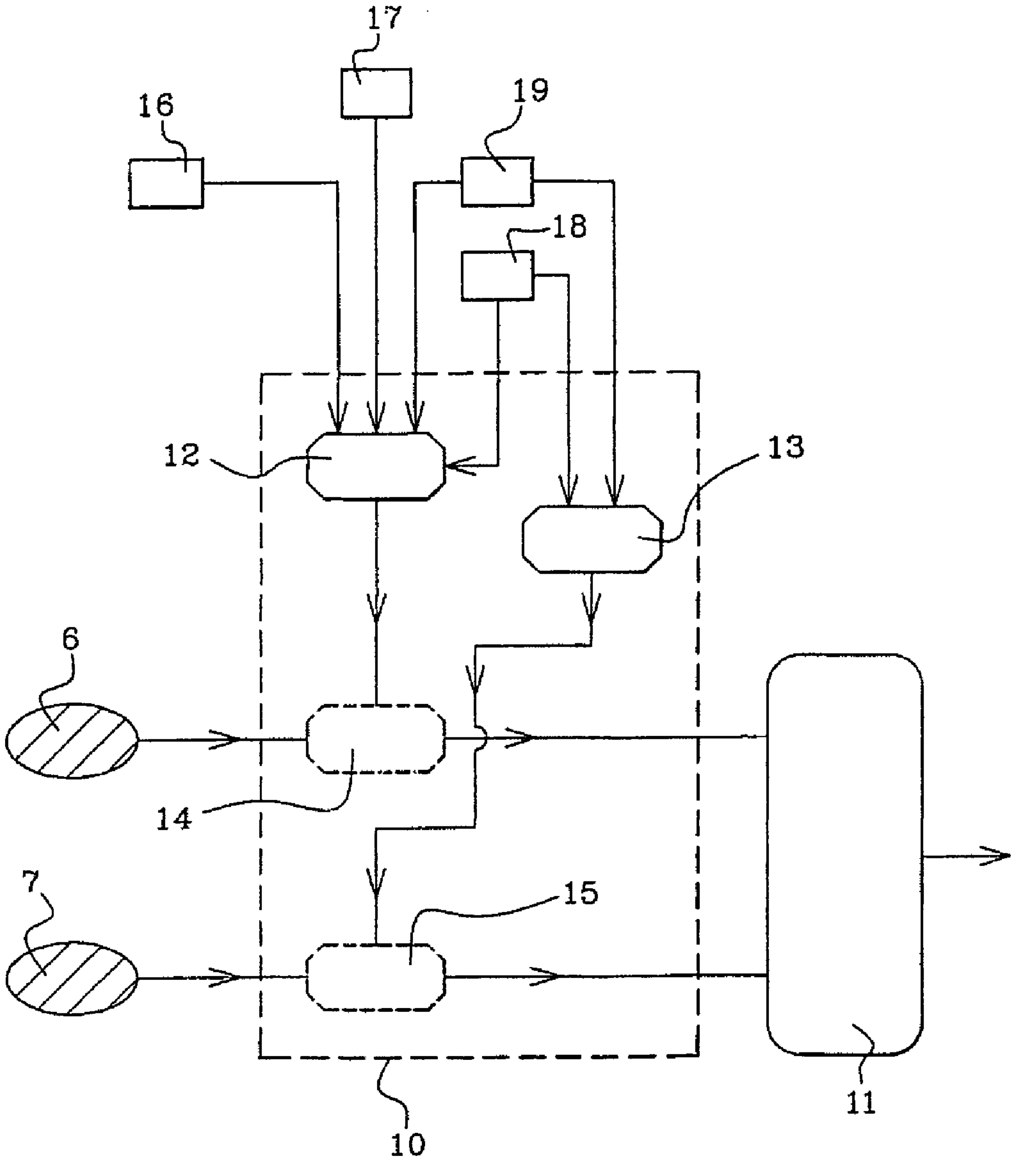
Figure 4:
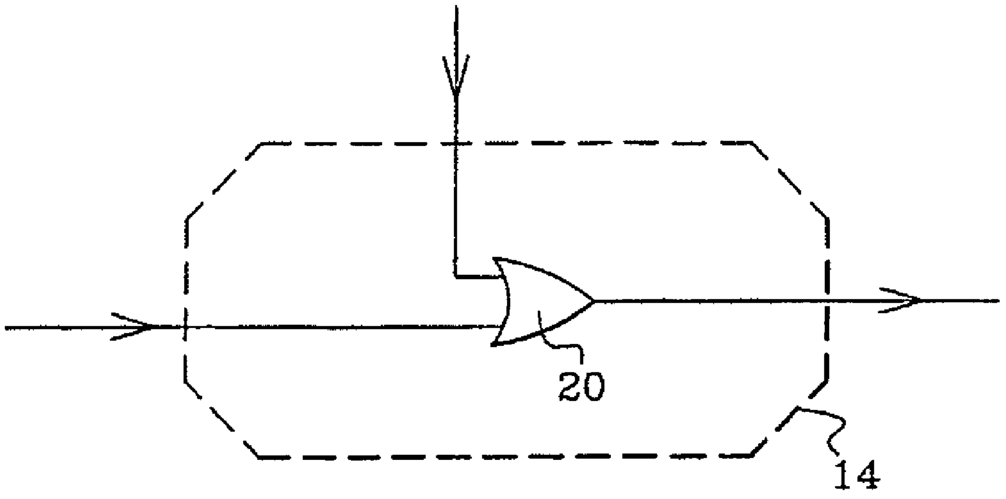
Figure 5:
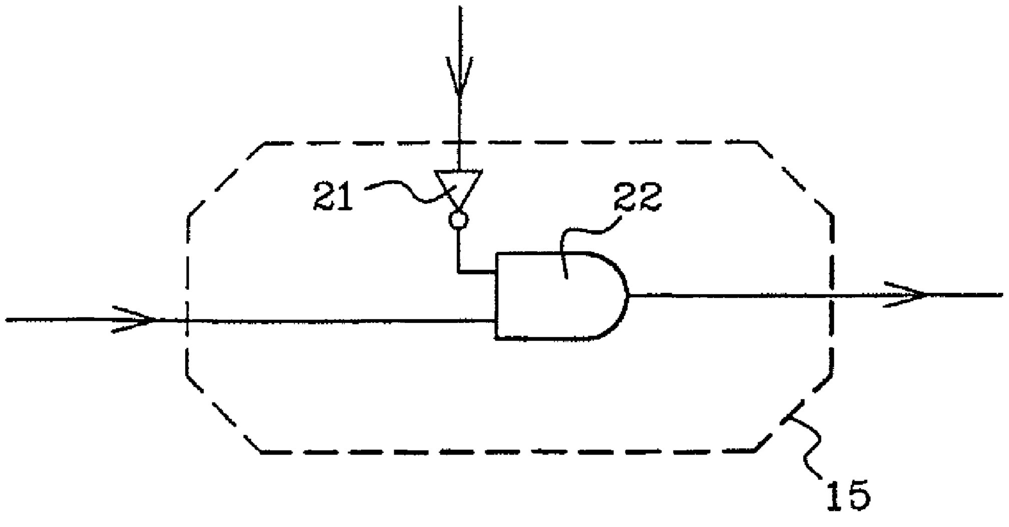
Figure 6:
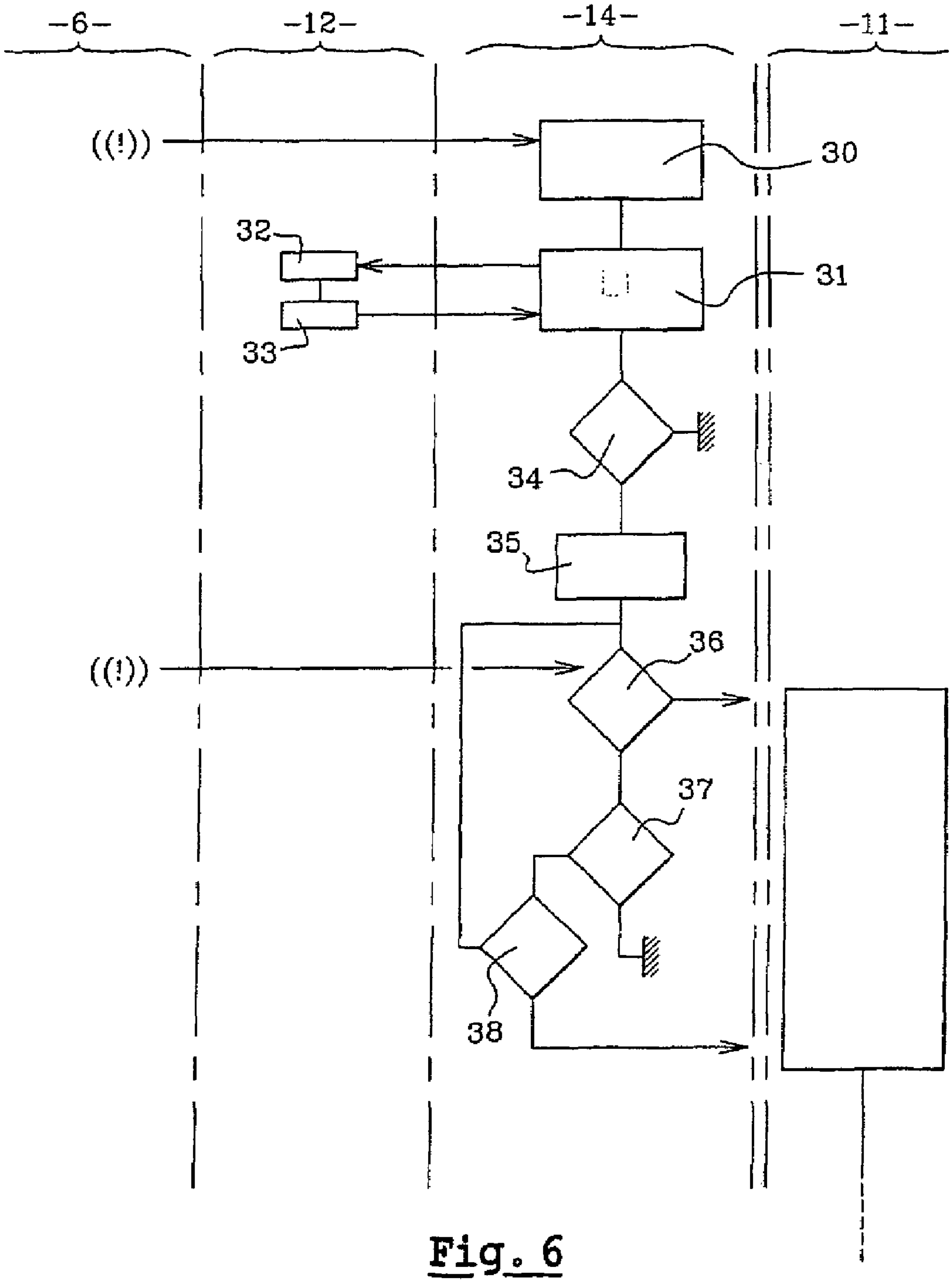
Figure 7:
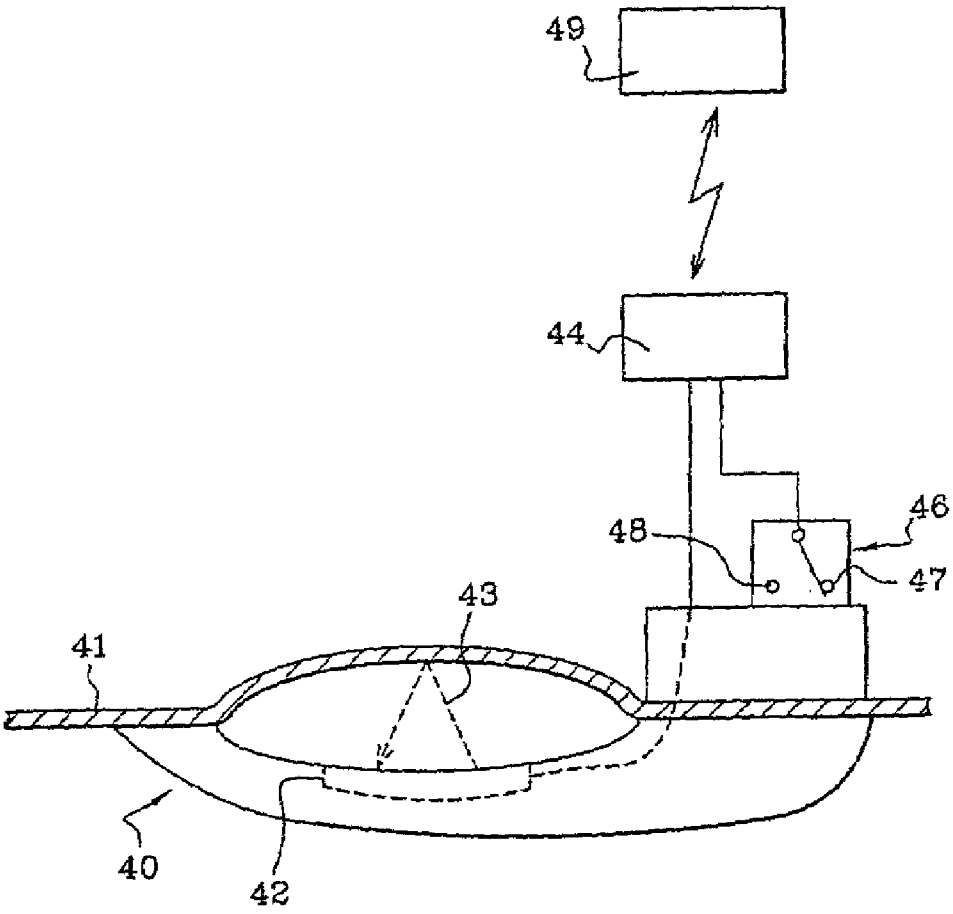
Figure 8:
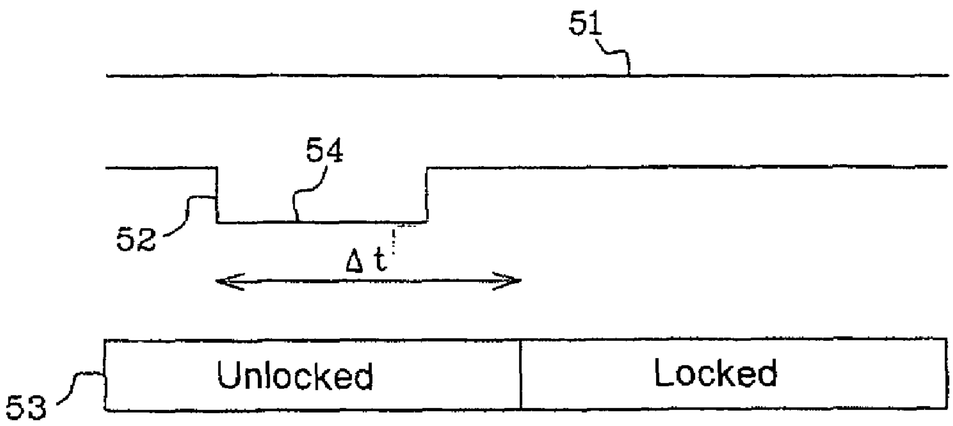
Figure 9:
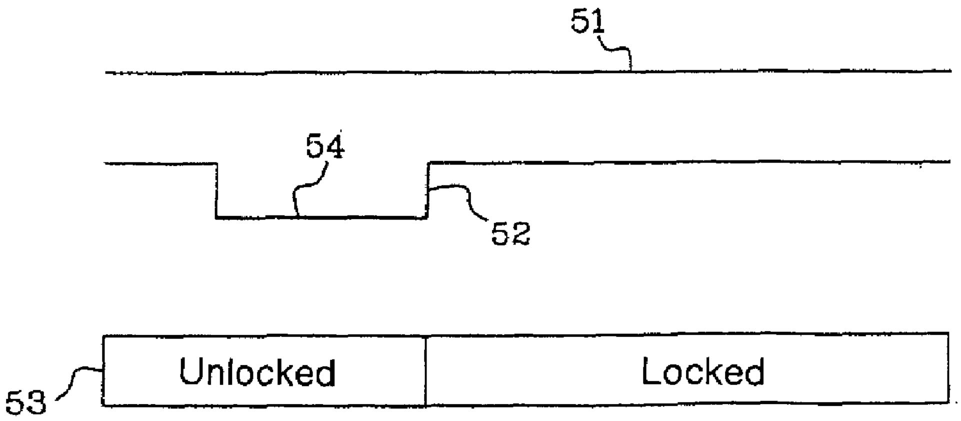

With the aim of facilitating the understanding of the invention, an embodiment thereof will now be described by way of nonlimiting example, with the aid of the appended drawings in which:

FIG. 1 is a perspective view of a door handle of a motor vehicle,

FIG. 2 is similar to FIG. 1 and shows the detection field of each detection zone of the handle, FIG. 3 is a functional diagram illustrating a processing method according to the invention, FIG. 4 is a view of a detail of an interpretation module of the diagram of FIG. 3, FIG. 5 is a view of a detail of another interpretation module of the diagram of FIG. 3, FIG. 6 is a schematic diagram of the steps implemented in an openable panel handle during an attempt to lock the latter, FIG. 7 is a diagrammatic representation of another openable panel handle, FIG. 8 is a first graph illustrating a method implemented by the handle of FIG. 7, FIG. 9 is a second graph illustrating another method implemented by the same handle.

In the embodiment described, the handle 1 comprises a central gripping part 2 and two fixing ends, one 3 pivoting the other 4 sliding, allowing the handle to be operated so as to open the door.

The central part 2 comprises an interior clearing 5 leaving a space for the fingers of a user wishing to pull the handle toward himself.

In the region corresponding to this clearing 5, on the inside, the handle comprises an approach detection zone 6, delimited by a broken line in the drawing.

On the outside and in line with its sliding end 4, the handle comprises a tactile detection zone 7 delimited likewise by a broken line and consisting of a capacitive sensor 8, a portion of which appears through the open end 9 of the handle.

This tactile zone 7 is provided so as to detect the application of a finger of the user, while the approach zone 6 detects the fact that a user is passing his fingers behind the handle so as to grasp it.

It is noted, in FIG. 2, that the detection fields 6*a*, 7*a* of these two zones are of different dimensions, the approach detection zone 6 having a larger range than the tactile detection zone 7.

The handle is covered with a metalized paint giving a chrome-plated rendition (not visible in the drawing).

This paint impairs the visibility of the two sensors and gives rise, or may give rise, to an at least partial overlapping of the two detection zones 6, 7.

Moreover, the ergonomics of the handle can be such that the hand of the user grasping or approaching said handle is simultaneously in both detection fields 6*a*, 7*a*, even if they do not overlap.

Therefore, the two sensors demarcating the detection zones 6, 7 sometimes provide inaccurate information.

In accordance with the invention, processing means 10, represented diagrammatically in FIG. 3, are interposed between the detection zones 6, 7 and control means 11, which serve for the determination and the execution of the actions requested by the user.

As may be seen in FIG. 3, the processing means 10 comprise state modules 12, 13 and interpretation modules 14, 15.

Each state module 12, 13 is linked to various detectors 16–19 placed on the vehicle, the function of these detectors being to gather the overall state of the vehicle.

For example, the detector 16 signals that an openable panel of the vehicle is locked. The detector 17 signals that a door is open, etc.

Thus, the state modules 12, 13 are capable of overall determination of the state of the vehicle with regard to the relevant criteria in respect of the triggering of an action corresponding to the user's requests.

Under the assumption that the detection zone 6 concerns the control means 11 only according to the criterion of a positive detection, that is to say of a presence detected in the detection field 6*a*, the role of the interpretation module 14 is to contrive matters such that, seen by the control means 11, the detection zone 6 always provides a true signal when the predetermined conditions are verified by the state module.

To this end, an OR gate 20, as represented in FIG. 4, proves satisfactory.

Likewise, under the assumption that the detection zone 7 concerns the control means 11 in respect of an absence of detection, that is to say that the control means verify only that the user is not detected in the detection zone 7*a*, it is necessary, in accordance with the invention, for the signal reaching the control means 11 to be systematically false when the corresponding predetermined conditions are satisfied, and to be so even if the detection zone emits a true signal.

To this end, as represented in FIG. 5, a NOT gate 21 is placed at the output of the state checking module and an AND gate 22 is placed after this NOT gate so as to combine this output with the signal from the sensor, in order to provide the control means 11 with a signal which is that from the sensor when the predetermined conditions are not fulfilled and which is always false when these conditions are fulfilled.

Other layouts of the interpretation modules are naturally possible as a function of the specific features of the control means.

Furthermore, the control means can also be modified in their organization, for example by installing checking shunts in such a way as to ignore the reading of a detection zone when the corresponding predetermined conditions are fulfilled.

The processing method according to the invention can for example be implemented if the exterior tactile detection zone 7 corresponds to a command for manual locking of the openable panels of the vehicle and if the interior approach detection zone 6 is used to ensure the unlocking of the lock, the freeing of the lock allowing the opening of the door and the deactivating of the alarm.

In the locked state of the vehicle, which state is provided by the state module, it is unnecessary to read the tactile locking zone. This zone is therefore disabled in accordance with the invention and any detection provided by either of the two detection signals is regarded as coming from the interior sensor.

Conversely, if the door is open, it is unnecessary to read the interior approach detection zone and any signal originating from either of the two sensors of the handle is regarded as necessarily originating from the tactile detection zone instructing manual locking of all the openable panels.

The state modules 12, 13 and the interpretation modules 14, 15 are preferably integrated into the handle so that the processing method according to the invention takes place inside the handle and that this latter is seen by the vehicle control means as a facility delivering clear locking and unlocking signals, in the sense that the control means no longer have to discriminate between various requests for possible action which are made by the user.

Represented in FIG. 6 is an example of a succession of steps of the processing method which can be implemented in the handle.

During a first step 30, which takes place in the interpretation module 14, a detection signal following upon an activation of the detection zone 6 is perceived by the interpretation module.

During a next step 31, the interpretation module interrogates the state module 12, which, during a step 32, interrogates the various detectors 16-19 placed on the vehicle and, during the next step 33, provides the state module 14 with the globalized environmental information.

A next step 34, executed in the interpretation module 14, consists of a test of the environmental information received.

If predetermined conditions are not fulfilled, the method stops and no signal is sent to the control means 11.

On the other hand, if the environmental conditions are fulfilled, the interpretation module 14 triggers, during a step 35, a countdown of time of a predetermined delay.

During the next step 36, a test of the detection zone 6 is again performed in order to ascertain whether the detection signal is still present.

If it is not, the user is deemed to have wanted to lock the openable panel supporting the handle and a locking signal is sent to the control means 11.

If not, the method continues with a test, corresponding to step 37, in the course of which test a switch present on the handle (switch not represented in FIGS. 1 and 2) is investigated. If it transpired that the switch has toggled before the expiration of the predetermined delay, the method stops and no signal is delivered to the control means.

On the other hand, if the switch has not toggled, the method goes to a next step 38 in the course of which a test is carried out as to whether the predetermined delay has elapsed so as either to loop back to the test of step 36, or to exit the loop so as to deliver a locking signal to the control means 11.

Under all assumptions, the control means receive a directly executable locking signal.

In FIG. 7, a door handle 40 which is mounted on the exterior part of an openable panel 41 of a motor vehicle, is equipped with an optical approach sensor 42 able to emit and to receive an optical beam 43. This optical sensor 42 is electrically connected to a recognition device 44 of a hands free access system in such a way as to emit toward the latter a characteristic electrical signal when it detects a cutting of the optical beam. More particularly, the optical emitter and receiver of the approach sensor 42 are mounted in the handle and the optical beam 43 is emitted from the handle toward the openable panel 41 and reflected by the latter toward the handle so that it is cut when the hand of a user of the vehicle is engaged with the handle, this being detected by the recognition device 44. The recognition device is installed inside the vehicle as is known and is able to communicate with a handheld identification facility carried by the user of the vehicle.

The door handle is furnished for example with a two-position switch 46 which changes position when the handle is moved from a rest position, the so-called released position, to an engaged position when it is operated, this allowing the opening of the door of the vehicle. In FIG. 7, the released position of the handle is indicated on the switch 46 by 47 and the engaged position of the handle is indicated by 48. This switch is linked to the recognition device 44 so as to provide it with a signal representative of the change of position of the switch and hence of the handle. In place of the handle switch, it would be possible to envisage a two-position (interior) open-door contactor which changes position when the openable panel is moved from the closed position to the open position or vice versa.

In FIG. 8 which is a representation of signals 51 and 52 respectively emitted by the switch 46 and by the approach sensor 42 toward the recognition device, represented therein is the corresponding alteration over time of the state 53 of the openable panel of the vehicle which will preferably be the driver's door of the vehicle. At the outset, the openable panel is unlocked. The handle is in a released state: the electrical signal 51 indicates that the switch 46 is in the position 47. When the electrical beam 43 is cut for a duration 54, this being detected by a change 1 of the signal 52, the recognition device 44 verifies that the switch 46 remains in the position 47 (the handle remaining released), this being indicated by the signal 51, for a duration ?t which is prerecorded (of the order of 2 seconds) counting from the detection of the change of state of the switch 46. If the recognition device does not detect any change of state of the switch 46 for the duration ?t, it instructs the locking of the openable panel of the vehicle on completion of the duration ?t.

According to another mode of implementation of the method according to the invention, illustrated by FIG. 3, the locking of the openable panel of the vehicle is instructed as soon as the optical beam is no longer cut, this being detected by a change of the signal 52. As compared with the way in which the method illustrated in FIG. 8 takes place, that of FIG. 9 helps to make the handsfree access system more responsive. Specifically, in the case of FIG. 9, the openable panel can be locked in a shorter time than ?t. However, in this mode of implementation, it is nevertheless necessary to monitor the switch 46 after having detected that the beam is no longer cut. More particularly, if very soon after the detection that the optical beam 43 has been cut, the switch 46 changes position (the handle for example is engaged), it is necessary to instruct the unlocking of the openable panel of the vehicle as soon as the change of position of the switch is detected, since the situation is then one in which the user wishes to open the openable panel of the vehicle.

The implementation of the method according to FIG. 8 can be adapted to introduce a timeout ?t intended to avoid instabilities such as succession of locking and of unlocking when the user moves his hand in the handle.

During the detection of the cutting of the optical beam 43, the recognition device 44 will be able to make an attempt to authenticate an identification facility 49, in such a way as to furthermore condition the locking of the vehicle to the authentication of the identification facility 49. Authentication can be advantageously supplemented with a locating of the identification facility 49 so that the command for locking the openable panel is triggered only if the identification facility 49 authenticated by the recognition device 44 is outside the vehicle.

The locking of the openable panel is conventionally effected on detection of the cutting of the optical beam 43 and of the changing of position of the handle 40 (which is operated) which is indicated by a changing of the signal 52.

Thus, the method according to the invention makes it possible to automatically lock and unlock a vehicle openable panel with the aid of a handsfree access system equipped with an approach sensor and with a two-position switch.

The examples provided hereinabove are of an entirely nonlimiting nature. They may be modified in any desirable manner without thereby departing from the scope of the invention.

The invention claimed is:

1. A method for locking/unlocking at least one vehicle opening comprising control means able to lock/unlock said opening and processing means (10) provided to take into account environmental information, the method comprising the steps of:

detecting a detection signal (52) from at least one detection zone (6, 7, 42) disposed on an automobile vehicle, receiving environmental information concerning the at least one vehicle opening, sending an activation signal to the control means when the detection signal (52) has not been ignored, said activation signal being sent by the processing means (10), wherein the environmental information relates to the state of locking of an openable panels (41) of the vehicle, wherein, when the environmental information fulfills predetermined conditions, the detection signal is interpreted as having to be ignored, and wherein the signal from the detection zone is ignored by one of disabling the means of reading the signal from the detection zone, replacing the signal by a constant signal of true Boolean value, and replacing the result of any check performed on this signal in the form of checks of detection and also checks of absence of detection with a constant signal of true Boolean value.

2. The method as claimed in claim 1, wherein, during the reception of the detection signal, temporal information related to the detection signal (52) received is also taken into account in addition to the environmental information.

3. The method as claimed in claim 1, wherein, when the environmental information fulfills predetermined conditions, the detection signal (52) is interpreted as a command for verifying the identity of a person whose action is detected.

4. The method as claimed in claim 3, wherein one of the predetermined conditions is that at least one openable panel of the vehicle is locked or unlocked.

5. The method as claimed in claim 4, wherein the identity verification command is followed by an unlocking or locking command.

6. The method as claimed in claim 2, wherein the temporal information is used to interpret the signal received either as a command for unlocking or for locking a single openable panel, or as a command for unlocking or for locking all the openable panels of the vehicle.

7. The method as claimed in claim 6, wherein the duration of the detection signal is chosen as temporal information related to this signal, a signal of short duration corresponding to the unlocking of an openable panel associated with the detection zone while a signal of long duration corresponds to the unlocking of all the openable panels.

8. The method as claimed in claim 6, wherein the delay between the start of the detection signal received and the change of position of a switch is chosen as temporal information related to the detection signal received.

9. The method as claimed in claim 8, wherein the switch is linked to a handle for opening the associated openable panel, said switch changing position when the handle is operated or released.

10. The method as claimed in claim 9, in which the openable panel is initially locked, wherein the openable panel is unlocked only if said delay is less than a predetermined duration, while all the openable panels are unlocked if said delay reaches the predetermined duration.

11. The method as claimed in claim 9, in which the openable panel is initially unlocked, wherein the openable panel (41) is locked if the delay is greater than a predetermined duration ($\Delta t$).

12. The method as claimed in claim 1, wherein the detection signals originate from at least two independent detection zones (6, 7) disposed on the motor vehicle, each of said detection zones being able to provide its own detection signal.

13. The method as claimed in claim 1, wherein the at least one detection zone is mounted on a handle (1) of the vehicle.

14. The method as claimed in claim 13, wherein the handle (1) is mounted on an openable panel of the vehicle.

15. The method as claimed in claim 1, wherein the signal from the detection zone is ignored by disabling the means of reading the signal from the detection zone.

16. The method as claimed in claim 1, wherein the signal from the detection zone is ignored by replacing said signal by said constant signal of true Boolean value.

17. The method as claimed in claim 1, wherein the signal from the detection zone is ignored by replacing the result of any check performed on this signal, in the form of checks of detection and also checks of absence of detection, with the constant signal of true Boolean value.

18. A processing device for implementing the method according to claim 1, comprising a handle with a detection area (6, 7, 42) and processing means (10) comprising at least one state module (12, 13) able to take into account environmental information, as well as at least one signal interpretation module (14, 15), said interpretation module providing an actuation signal depending on the environmental information and directly usable by the control means.

19. The device as claimed in claim 18, further comprising duration measuring means providing information related to the detection signal received.

20. The device as claimed in claim 18, further comprising means for verifying predetermined conditions.

21. The device as claimed in claim 18, wherein the interpretation module (14) is placed directly downstream of a sensor and consists of an OR gate (20) accepting as input on the one hand the signals from the sensor, on the other hand the result, provided by the state module (12), of the verification of the conditions.

22. The device as claimed in claim 18, wherein the interpretation module (15) is placed directly downstream of a sensor and consists of a NOT gate (21) at the output of the state checking module (13) and an AND gate (22) which combines the output with the signal from the sensor.

23. The device as claimed in claim 18, wherein the interpretation module is placed directly downstream of any detection checking module and that it consists of an OR gate combining the result of the detection check with the result of the verification of predetermined conditions.

24. The device as claimed in claim 18, wherein the at least one detection zone form an integral part of a vehicle handle (1), which is advantageously mounted on an openable panel of the vehicle.

25. A motor vehicle openable panel handle comprising on the one hand at least one detection zone (6, 7, 42), on the other hand, a processing device (10) according to claim 18, providing an actuation signal directly usable by control means outside the handle.

26. The handle as claimed in claim 25, wherein the detection zone (6, 7, 42) is sensitive to one of a variation in electric or electromagnetic field, and a cutting of a light beam.

27. The handle as claimed in claim 26, wherein the detection zone is disposed on the handle in such a way that the ambient electric or electromagnetic field is disturbed or that the optical beam is cut when a hand is engaged with the handle.

28. A motor vehicle comprising at least one openable panel, at least one detection zone and a processing device according to claim 18.

29. The motor vehicle as claimed in claim 28, wherein the openable panel is furnished with a handle comprising at least one detection zone (6, 7, 42) that is sensitive to one of a variation in electric or electromagnetic field, and a cutting of a light beam and incorporating the processing device.

* * * * *